United States Patent [19]
Miller

[11] 3,907,218
[45] Sept. 23, 1975

[54] HEAVIER-THAN-AIR FREIGHT AIRCRAFT HAVING LIGHTER THAN AIR GAS COMPARTMENTS

[76] Inventor: Ralph H. Miller, 13619 Sunset, Detroit, Mich. 48212

[22] Filed: May 2, 1974

[21] Appl. No.: 466,418

[52] U.S. Cl. .................................. 244/5; 244/36
[51] Int. Cl.² ........................................ B64C 1/00
[58] Field of Search ............... 244/5, 13, 25, 30, 36, 244/45 R, 2, 15; D12/76

[56] References Cited
UNITED STATES PATENTS

| | | | |
|---|---|---|---|
| 722,516 | 3/1903 | Johnston | 244/25 |
| 1,033,186 | 7/1912 | Merckens | 244/25 |
| 1,228,159 | 5/1917 | Ziperstein et al. | 244/25 |
| 1,700,107 | 1/1929 | Pupp | 244/5 |
| 2,412,285 | 12/1946 | Peck | 244/5 |
| D127,158 | 5/1941 | Oliver | D12/76 |
| D188,226 | 6/1960 | Janes | D12/76 |

*Primary Examiner*—Trygve M. Blix
*Assistant Examiner*—Galen L. Barefoot
*Attorney, Agent, or Firm*—William L. Fisher, Esq.

[57] ABSTRACT

Improvements in heavier-than-air freight aircraft having forward thrust engines, wings, a rear fin and rudder, and a lighter-than-air gas lift mechanism for enhancing the aerodynamic lift provided by the forward thrust engines and wings, such improvement comprising respective forward and rear wings, three equally widthwise spaced apart gas compartments containing lighter-than-air gas disposed vertically above the forward wing, a freight compartment disposed vertically below the gas compartments, the forward and rear wings and the four compartments joined to each other to provide framing rigidity for the aircraft, the rear fin and rudder mounted upon the center one of the gas compartments so as to upstand vertically therefrom to obtain a clear aerodynamic cut into the air, a pilot compartment at the forward end of the center one of the gas compartments, each gas compartment of substantially uniform transverse cross-section, each compartment extending axially substantially full length of the aircraft, the rear wing being a substantially full width rear wing disposed vertically above the forward wing so as to have a substantially clear aerodynamic cut into the air, said forward wings comprising left and right forward partial-wing sections joined to the freight compartment.

5 Claims, 3 Drawing Figures

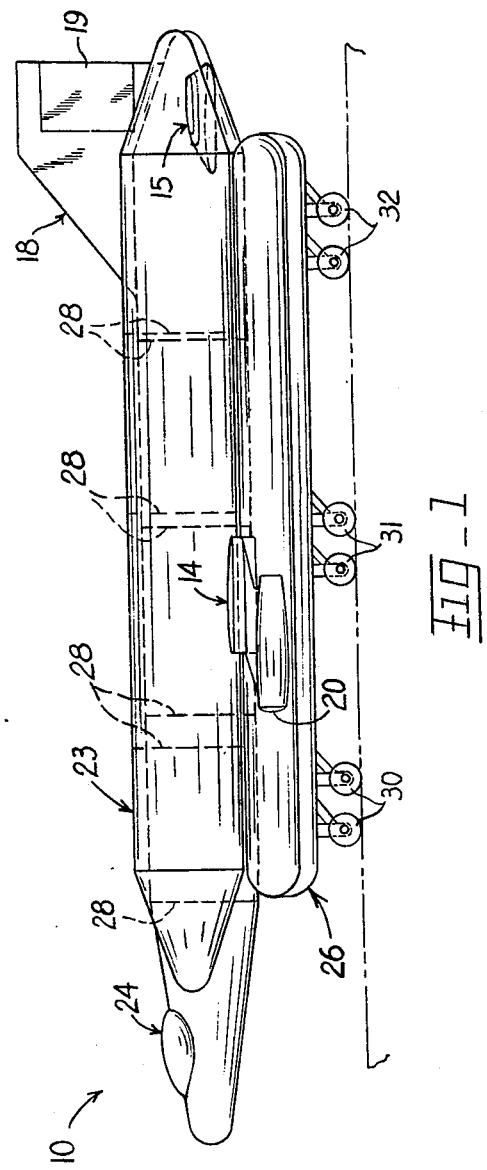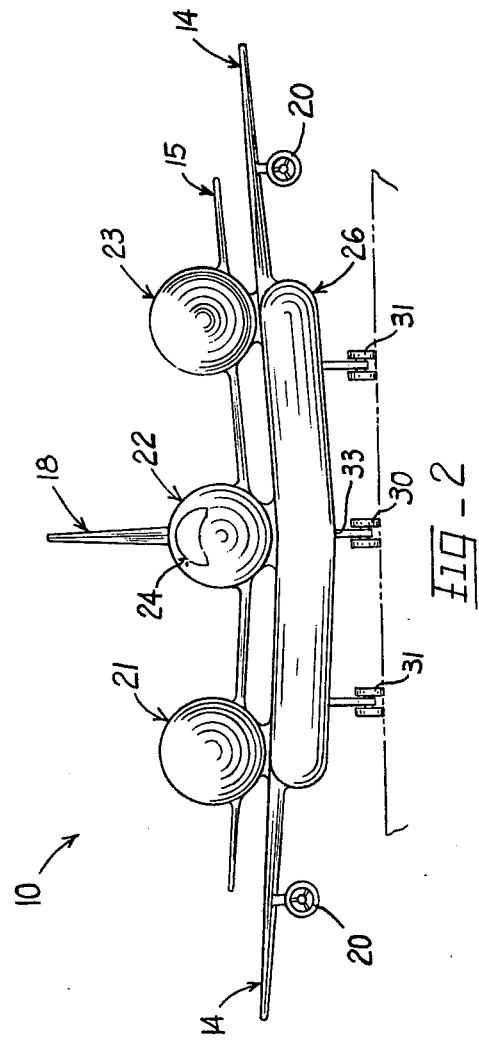

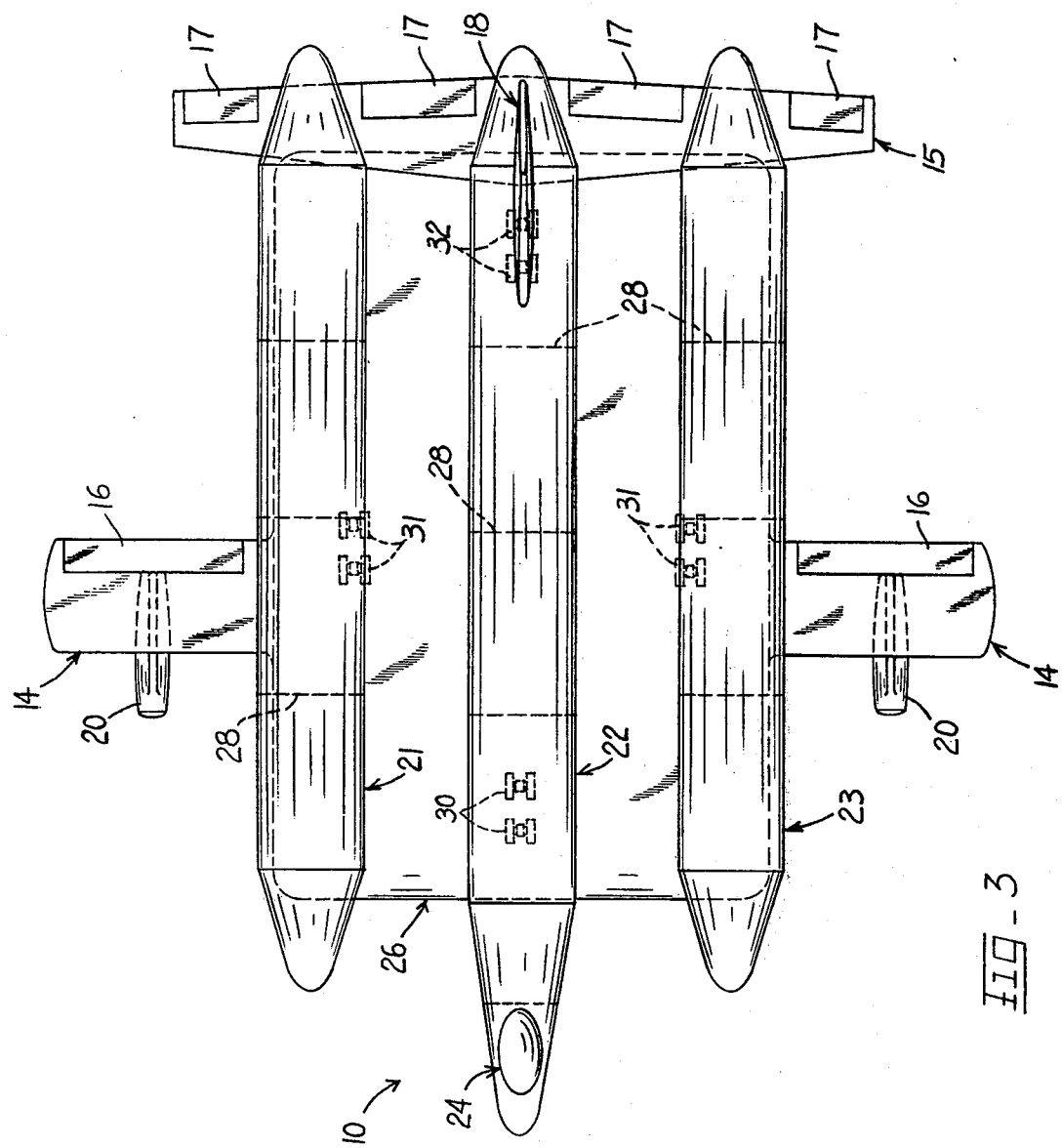

HEAVIER-THAN-AIR FREIGHT AIRCRAFT HAVING LIGHTER THAN AIR GAS COMPARTMENTS

My invention relates to heavier-than-air freight aircraft.

The principal object of my invention is to provide improvements in heavier-than-air freight aircraft which render said aircraft an effective freight aircraft capable of safely carrying a large freight payload, particularly at moderate speeds.

The foregoing object of my invention and the advantages thereof will become apparent during the course of the following description, taken in conjunction with the accompanying drawings, in which:

FIGS. 1–3 are, respectively, side, front elevational and top plan views of an improved freight aircraft embodying my invention.

Referring to the drawings in greater detail, 10 generally designates said embodiment which comprises forward wing means in the form of left and right partial-wing sections 14 and rear stabilizer full wing means 15. The forward and rear wings 14 and 15 have ailerons 16, and elevators 17, respectively. Said embodiment 10 further comprises rear fin and rudder means 18 and two pairs of forward thrust means 20. Said freight aircraft 10 is provided with three equally widthwise spaced apart gas compartment means 21, 22 and 23, each of which is of uniform transverse cross-section and contains lighter-than-air gas, such as helium, the center one 22 of which is provided with pilot compartment means 24 at the forward end thereof. Said gas compartment means 21, 22 and 23 must be disposed vertically above said forward wing section 14. Freight compartment means 26 is provided in the center of said aircraft 10 in the form of an oil tank which must be disposed vertically below said gas compartment means 21, 22 and 23. The framing for said compartment means 21, 22, 23 and 24 is utilized for joining together the framing for said forward and rear wing means 14 and 15 to provide framing rigidity for said aircraft. Said forward thrust means 20, in the instance, are each in the form of a conventional propellor or jet engine supported on said forward wing sections 14. Said rear wing 15 is a substantially full width wing disposed vertically above said forward wing sections 14 so that it has a clear aerodynamic cut into the air. The oil tank 26 is provided with an aerodynamic shape, particularly the top and bottom walls thereof, which have the same contour as that of the forward wing means 14. At relatively higher speeds of said aircraft 10 the oil tank 26 functions as a glider wing so that a substantially full width forward wing means is also provided at these speeds. The framing for said center gas compartment means 22 is used for joining together the framing for said rear fin 18 and rudder means 19. Each said gas compartment means 21 and 23 is provided with lengthwise spaced apart compartment divider means 28 forming interior gas-tight chambers therebetween for containing separate containers for and quantities of helium. The separate helium chambers in each said gas compartment are for balancing the helium lift both lengthwise and widthwise of the aircraft and for safety in case of accidental escape of helium gas. Forward, center and rear landing gear means 30 and 32, respectively, are made fast to the underside of said oil tank 26 for use in take-off and landing of said aircraft 10. The bottom wall of said oil tank 26 is downwardly V-shaped so that the center longitudinal portion 33 thereof is its lowest portion for draining crude oil carried in said oil tank 26. The gas lift provided by said three gas compartment means 21, 22 and 23, in combination with the aerodynamic lift provided by the forward thrust means 20 and the forward and rear wings 14 and 15, effect a substantial fuel economy in flight and substantially enhance: (a) the take-off and landing flight characteristics of said aircraft 10 making it capable of taking off and landing in shorter distances; (b) the cruising flight characteristics thereof making it a safer aircraft capable of gliding safely to the ground; and (c) the payload-carrying ability thereof making it capable of carrying heavier freight loads per unit of deadweight.

It will thus be seen that there has been provided by my invention an improved freight aircraft in which the object hereinabove set forth, together with many thoroughly practical advantages, has been successfully achieved. For example, said freight aircraft can be used as an oil tanker aircraft to transport on each delivery flight thereof bulk quantities of crude oil, particularly out of arctic regions to warm water ports. While a preferred embodiment of my invention has been shown and described it is to be understood that variations and changes may be resorted to without departing from the spirit of my invention, as defined by the appended claims.

What I claim is:

1. Improvement in heavier-than-air freight aircraft having forward thrust means, wing means, rear fin and rudder means, and lighter-than-air gas lift means for enhancing the aerodynamic lift provided by said forward thrust means and wing means, said improvement comprising respective forward and rear wing means, three equally widthwise spaced apart gas compartment means containing lighter-than-air gas disposed vertically above said forward wing means, a single freight compartment means disposed vertically below all of said gas compartment means, said forward and rear wing means and said gas and freight compartment means joined to each other to provide framing rigidity for said aircraft, said rear fin and rudder means mounted upon the center one of said gas compartment means so as to upstand vertically therefrom to obtain a clear aerodynamic cut into the air, a pilot compartment at the forward end of the center one of said gas compartment means, each said gas compartment means of substantially uniform transverse cross-section, each said compartment means extending axially substantially full length of said aircraft, said rear wing means being a substantially full width rear wing disposed vertically above said forward wing means so as to have a substantially clear aerodynamic cut into the air, said forward wing means comprising left and right forward partial wing sections joined to said freight compartment means.

2. Improvement in heavier-than-air freight aircraft having forward thrust means, wing means, rear fin and rudder means, and lighter-than-air gas lift means for enhancing the aerodynamic lift provided by said forward thrust means and wing means, said improvement comprising respective forward and rear wing means, three equally widthwise spaced apart gas compartment means containing lighter-than-air gas disposed vertically above said forward wing means, freight compartment means disposed vertically below said gas compartment means, said forward and rear wing means and said gas and freight compartment means joined to each other to provide framing rigidity for said aircraft, said rear fin and rudder means mounted upon the center one of said gas compartment means so as to upstand vertically therefrom to obtain a clear aerodynamic cut into the air, a pilot compartment at the forward end of the center one of said gas compartment means, each said gas compartment means of substantially uniform transverse cross-section, each said compartment means extending axially substantially full length of said aircraft, said rear wing means being a substantially full width rear wing disposed vertically above said forward wing means so as to have a substantially clear aerodynamic cut into the air, said forward wing means comprising left and right forward partial-wing sections joined to said freight compartment means, said freight compartment means having an aerodynamic shape so as to act as a wing at relatively higher speeds of said aircraft to provide a substantially full width forward wing at these speeds.

3. Improvement as claimed in claim 2, each said gas compartment means having separate lighter-than-air gas chambers therein for balancing the gas lift both lengthwise and widthwise of the aircraft for safety.

4. Improvement as claimed in claim 2, said freight aircraft being an oil tanker aircraft having, for said freight compartment means, an oil tank capable of containing oil.

5. Improvement as claimed in claim 4, said oil tank having a bottom wall thereof constructed at the longitudinal centerline thereof for oil drainage.

* * * * *